US012634936B2

(12) United States Patent
Liu et al.

(10) Patent No.: US 12,634,936 B2
(45) Date of Patent: May 19, 2026

(54) TECHNIQUES FOR SCHEDULING MULTI-USER SIDELINK COMMUNICATIONS IN MULTIPLE TIME PERIODS

(71) Applicant: QUALCOMM Incorporated, San Diego, CA (US)

(72) Inventors: Chih-Hao Liu, San Diego, CA (US); Yisheng Xue, San Diego, CA (US); Jing Sun, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 897 days.

(21) Appl. No.: 17/702,526

(22) Filed: Mar. 23, 2022

(65) Prior Publication Data

US 2023/0309098 A1     Sep. 28, 2023

(51) Int. Cl.
| | |
|---|---|
| *H04W 72/20* | (2023.01) |
| *H04L 1/00* | (2006.01) |
| *H04L 1/1812* | (2023.01) |
| *H04L 5/00* | (2006.01) |
| *H04W 72/1263* | (2023.01) |
| *H04W 92/18* | (2009.01) |

(52) U.S. Cl.
CPC .......... *H04W 72/20* (2023.01); *H04L 1/0003* (2013.01); *H04L 1/1812* (2013.01); *H04L 5/0053* (2013.01); *H04W 72/1263* (2013.01); *H04W 92/18* (2013.01)

(58) Field of Classification Search
CPC . H04W 72/20; H04W 72/1263; H04W 92/18; H04W 72/0446; H04W 72/25; H04W 72/40; H04L 1/0003; H04L 1/1812; H04L 5/0053; H04L 1/1893; H04L 1/0031; H04L 1/1887; H04L 1/1896; H04L 5/0094
USPC .......................................................... 370/329
See application file for complete search history.

(56) References Cited

U.S. PATENT DOCUMENTS

| | | | | |
|---|---|---|---|---|
| 12,047,312 | B2 * | 7/2024 | Chen ........................ | H04W 4/40 |
| 2021/0045178 | A1 * | 2/2021 | Kung ..................... | H04W 76/18 |
| 2021/0144691 | A1 * | 5/2021 | Balasubramanian ........................ H04L 1/1861 |  |
| 2021/0352626 | A1 * | 11/2021 | Sarkis ................... | H04W 72/20 |
| 2021/0400713 | A1 * | 12/2021 | He ......................... | H04W 72/21 |
| 2022/0070848 | A1 * | 3/2022 | Liu ...................... | H04B 7/0617 |

(Continued)

*Primary Examiner* — Jutai Kao
*Assistant Examiner* — Syed M Bokhari
(74) *Attorney, Agent, or Firm* — Arent Fox, LLP

(57) ABSTRACT

Some aspects described herein relate transmitting a first stage sidelink control information (SCI) that schedules multiple transport blocks (TBs) of shared channel communications in multiple time divisions, wherein each of the multiple TBs is for a different receiving UE of multiple receiving UEs, transmitting, to a first receiving UE of the multiple receiving UEs and based on the first stage SCI, at least a first TB of the multiple TBs of shared channel communications in a first time division of the multiple time divisions, and transmitting, to a second receiving UE of the multiple receiving UEs and based on the first stage SCI, at least a second TB of the multiple TBs of shared channel communications in a second time division of the multiple time divisions. Other aspects relate to receiving the first stage SCI and at least one TB.

26 Claims, 8 Drawing Sheets

_400

Generate the SCI — 414

Transmit a first stage SCI that schedules multiple TBs of shared channel communications in multiple time divisions — 402

Transmit a second stage SCI including SCI for multiple receiving UEs — 404

Transmit, to a first receiving UE and based on the first stage SCI, at least a first TB of the multiple TBs of shared channel communications in a first time division of the multiple time divisions — 406

Transmit, with at least the first TB, a first second stage SCI for at least the first TB — 410

Transmit, to a second receiving UE and based on the first stage SCI, at least a second TB of the multiple TBs of shared channel communications in a second time division of the multiple time divisions — 408

Transmit, with at least the second TB, a second second stage SCI for at least the second TB — 412

(56)                    References Cited

U.S. PATENT DOCUMENTS

| | | | |
|---|---|---|---|
| 2022/0140964 A1* | 5/2022 | Chen | H04W 4/40 |
| | | | 370/330 |
| 2022/0150908 A1* | 5/2022 | Ji | H04L 5/0055 |
| 2023/0026229 A1* | 1/2023 | Hui | H04L 1/1864 |
| 2023/0231660 A1* | 7/2023 | Wu | H04L 1/1816 |
| | | | 714/748 |

* cited by examiner

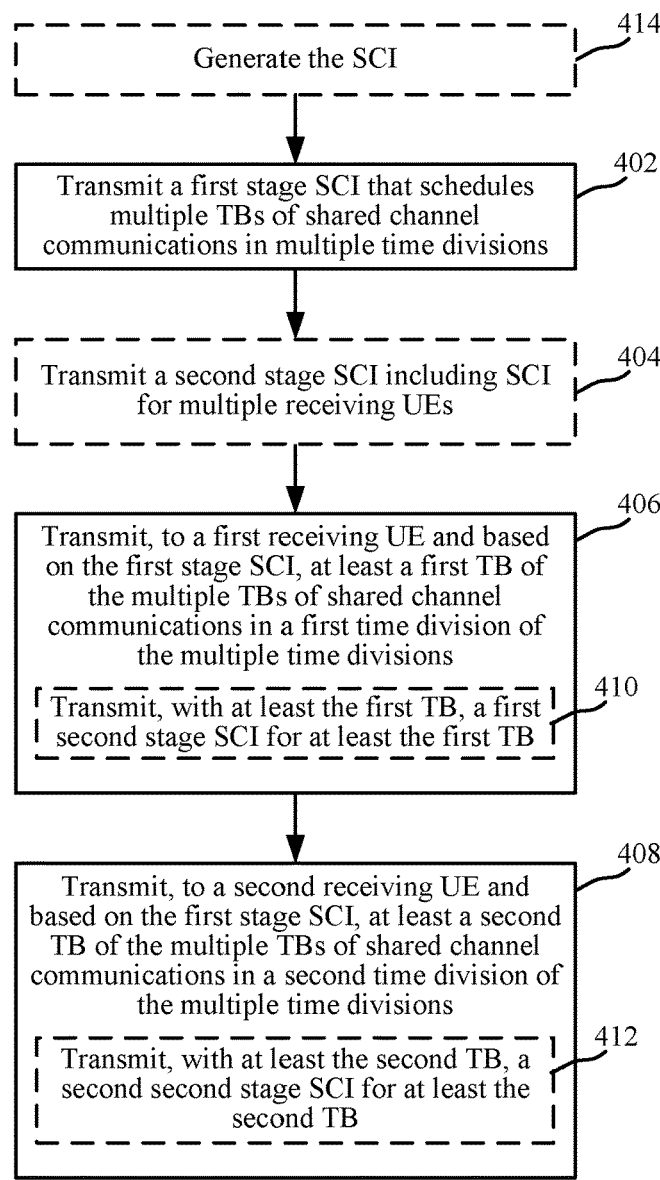
FIG. 4

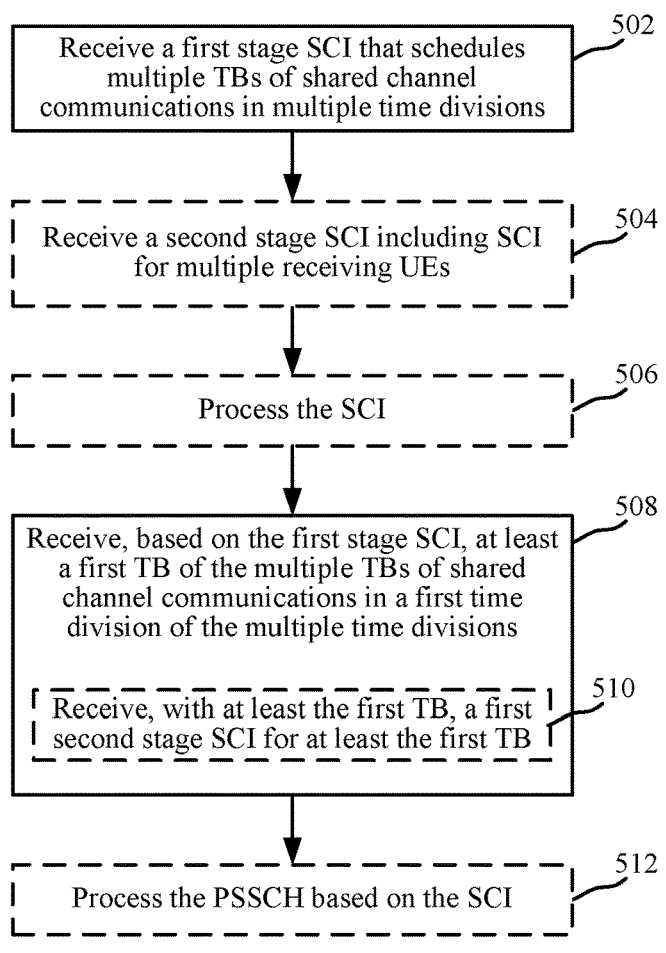

500

Receive a first stage SCI that schedules multiple TBs of shared channel communications in multiple time divisions

502

Receive a second stage SCI including SCI for multiple receiving UEs

504

Process the SCI

506

Receive, based on the first stage SCI, at least a first TB of the multiple TBs of shared channel communications in a first time division of the multiple time divisions

508

Receive, with at least the first TB, a first second stage SCI for at least the first TB

510

Process the PSSCH based on the SCI

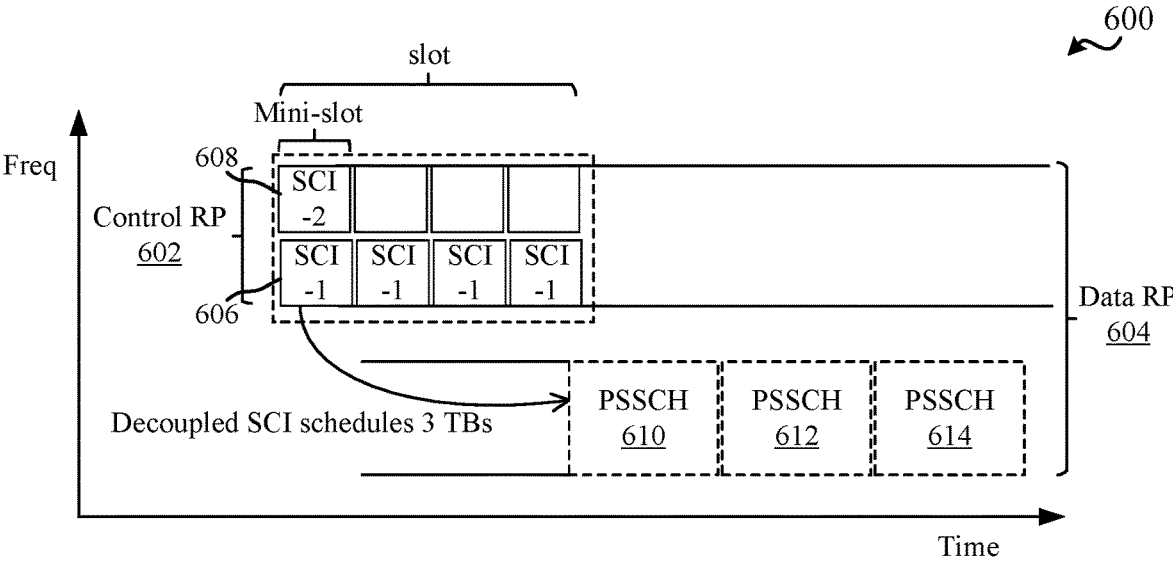
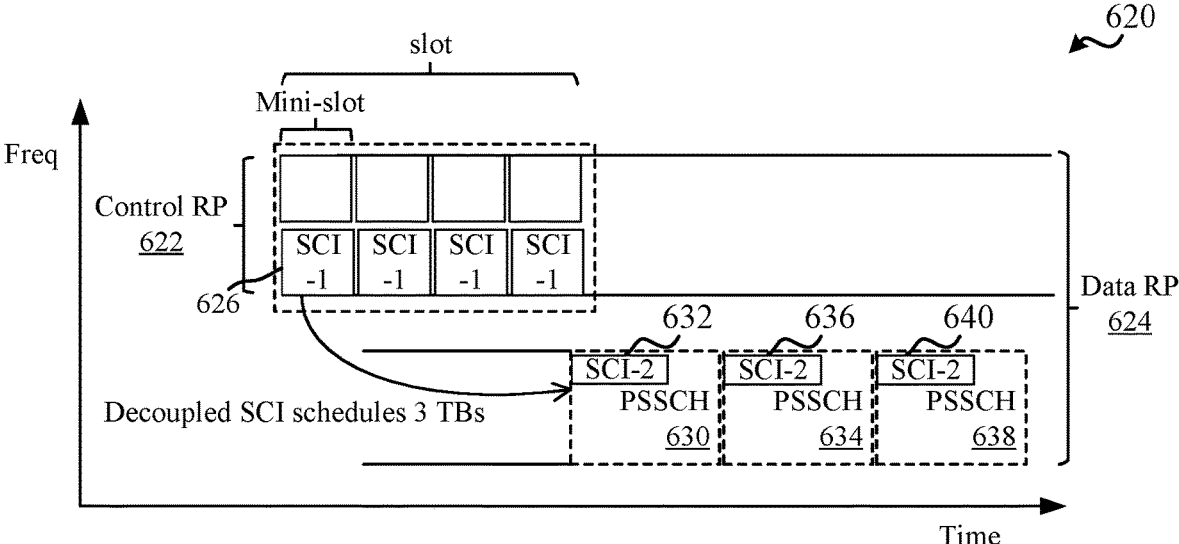
FIG. 6

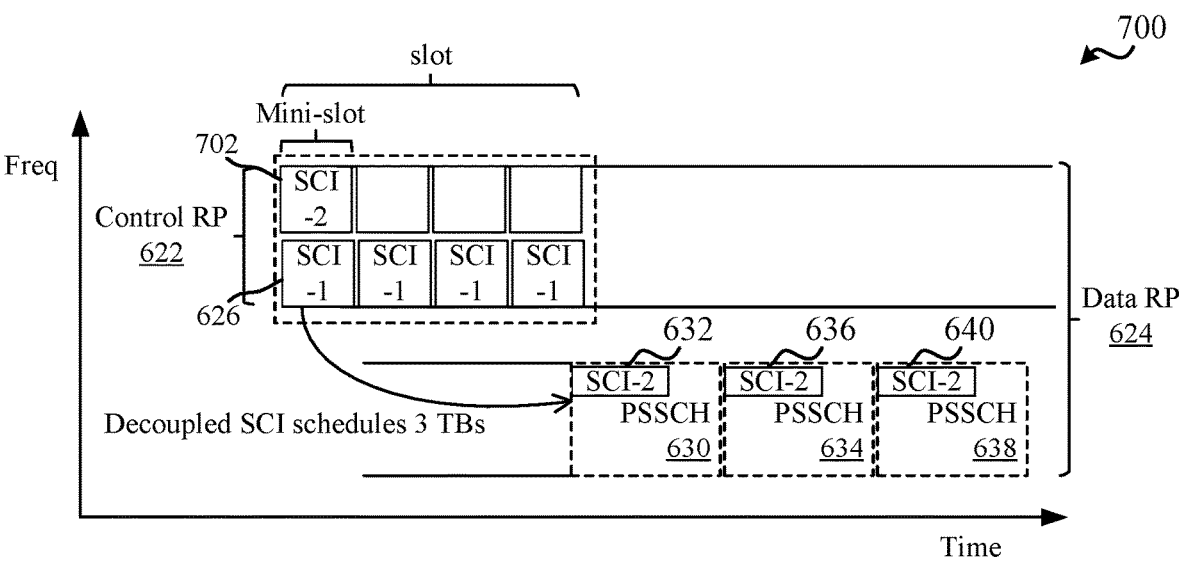
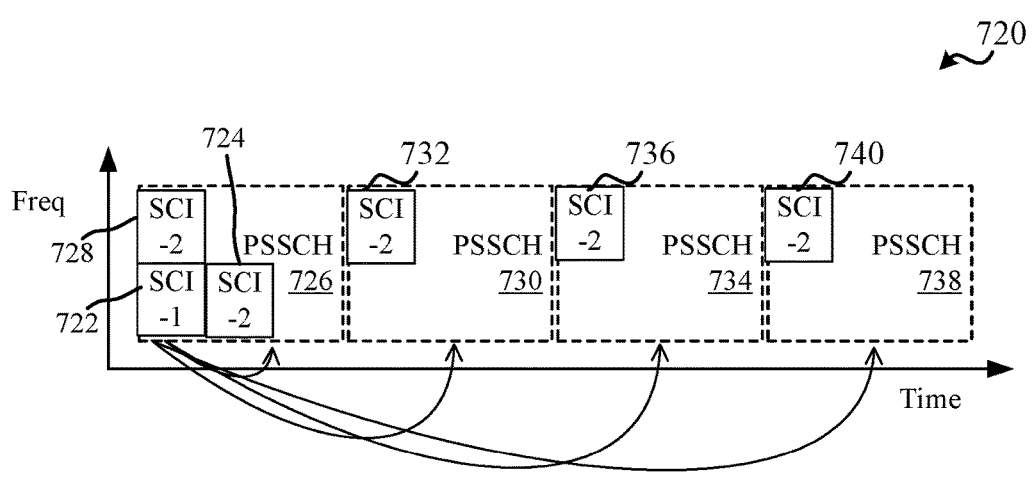
FIG. 7

TECHNIQUES FOR SCHEDULING MULTI-USER SIDELINK COMMUNICATIONS IN MULTIPLE TIME PERIODS

BACKGROUND

Aspects of the present disclosure relate generally to wireless communication systems, and more particularly, to scheduling sidelink communications.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable low-latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in 5G communications technology and beyond may be desired.

In some wireless communication technologies, such as 5G, user equipment (UEs) communicate over one or more of multiple interfaces. The multiple interfaces may include a Uu interface between the UE and a base station, where the UE can receive communications from the base station over a downlink and transmit communications to the base station over an uplink. In addition, the multiple interfaces may include a sidelink interface to communicate with one or more other UEs directly over a sidelink channel (e.g., without traversing the base station).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect an apparatus for wireless communication is provided that includes a transceiver, a memory configured to store instructions, and one or more processors communicatively coupled with the memory and the transceiver. The one or more processors are configured to transmit a first stage sidelink control information (SCI) that schedules multiple transport blocks (TBs) of shared channel communications in multiple time divisions, wherein each of the multiple TBs is for a different receiving UE of multiple receiving UEs, transmit, to a first receiving UE of the multiple receiving UEs and based on the first stage SCI, at least a first TB of the multiple TBs of shared channel communications in a first time division of the multiple time divisions, and transmit, to a second receiving UE of the multiple receiving UEs and based on the first stage SCI, at least a second TB of the multiple TBs of shared channel communications in a second time division of the multiple time divisions.

According to another aspect, an apparatus for wireless communication is provided that includes a transceiver, a memory configured to store instructions, and one or more processors communicatively coupled with the memory and the transceiver. The one or more processors are configured to receive a first stage SCI that schedules multiple TBs of shared channel communications in multiple time divisions, wherein each of the multiple TBs is for a different receiving UE of multiple receiving UEs, and receive, based on the first stage SCI, at least a first TB of the multiple TBs of shared channel communications in a first time division of the multiple time divisions.

In another aspect, a method for wireless communication by a transmitting user equipment (UE) in sidelink communications is provided that includes transmitting a first stage SCI that schedules multiple TBs of shared channel communications in multiple time divisions, wherein each of the multiple TBs is for a different receiving UE of multiple receiving UEs, transmitting, to a first receiving UE of the multiple receiving UEs and based on the first stage SCI, at least a first TB of the multiple TBs of shared channel communications in a first time division of the multiple time divisions, and transmitting, to a second receiving UE of the multiple receiving UEs and based on the first stage SCI, at least a second TB of the multiple TBs of shared channel communications in a second time division of the multiple time divisions.

In another aspect, a method for wireless communication by a receiving UE in sidelink communications is provided that includes receiving a first stage SCI that schedules multiple TBs of shared channel communications in multiple time divisions, wherein each of the multiple TBs is for a different receiving UE of multiple receiving UEs, and receiving, based on the first stage SCI, at least a first TB of the multiple TBs of shared channel communications in a first time division of the multiple time divisions.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 4 is a flow chart illustrating an example of a method for transmitting a single sidelink control information (SCI) to schedule multiple transport blocks (TBs) of shared channel communications, in accordance with various aspects of the present disclosure;

FIG. 5 is a flow chart illustrating an example of a method for receiving a single SCI scheduling multiple TBs of shared channel communications, in accordance with various aspects of the present disclosure;

FIG. 6 illustrates examples of resource allocations for transmitting a first stage SCI and one or more second stage SCIs for multiple TBs, in accordance with various aspects of the present disclosure;

FIG. 7 illustrates examples of resource allocations for transmitting a common second stage SCI for multiple TBs, in accordance with various aspects of the present disclosure.

DETAILED DESCRIPTION

Figure 1:
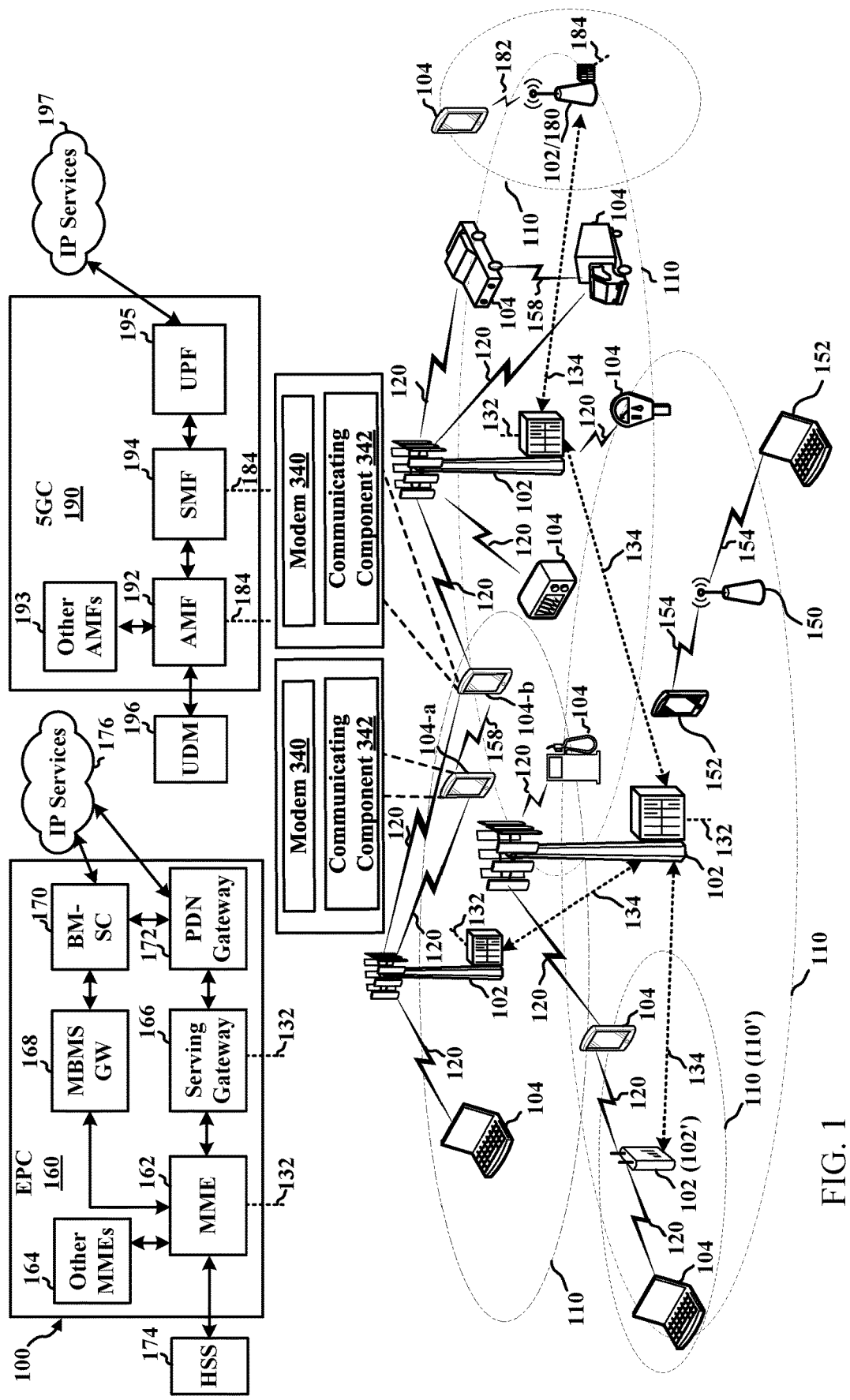
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to scheduling sidelink (SL) communications for multiple users (multi-user SL communications) in multiple time periods or time divisions, such as multiple slots, mini-slots, etc. For example, SL communications can refer to device-to-device (D2D) communication among devices (e.g., user equipment (UEs)) in a wireless network. In a specific example, SL communications can be defined for vehicle-based communications, such as vehicle-to-vehicle (V2V) communications, vehicle-to-infrastructure (V2I) communications (e.g., from a vehicle-based communication device to road infrastructure nodes), vehicle-to-network (V2N) communications (e.g., from a vehicle-based communication device to one or more network nodes, such as a base station), a combination thereof and/or with other devices, which can be collectively referred to as vehicle-to-anything (V2X) communications. In V2X communications, vehicle-based communication devices can communicate with one another and/or with infrastructure devices over a SL channel.

For example, a slot can include a collection of multiple symbols, where the multiple symbols can be one of orthogonal frequency division multiplexing (OFDM) symbols, single carrier-frequency division multiplexing (SC-FDM) symbols, or other types of symbols. In an example, the number of symbols in a slot may vary based on a cyclic prefix (CP) length defined for the symbols. A mini-slot, in an example, can include a portion of a slot, and thus a slot can include multiple mini-slots. In one example, UE can transmit SL communications in the slot or mini-slot, where a transmission time interval (TTI) can be the slot, the mini-slot, or each symbol within the slot or mini-slot.

Continued support and implementation of SL communications is provided in fifth generation (5G) new radio (NR) communication technologies. 5G NR defines SL Mode 1, where a SL transmitting UE can receive a scheduling grant from a gNB that schedules the frequency and/or time resources for SL transmission by the SL transmitting UE (e.g., PSCCH and/or PSSCH resources). 5G NR also defines SL Mode 2, where a SL transmitting UE can select resources for SL transmission from a resource pool, where the resource pool may be configured by the gNB.

In aspects described herein, a SL transmitting UE can transmit, to multiple SL receiving UEs, SL control information (SCI) that schedules multiple sidelink transmissions by the SL transmitting UE. For example, the SL transmitting UE can transmit the SCI over a physical sidelink control channel (PSCCH) defined in a set of resources, which may include a set of frequency resources over a set of time resources, such as in a channel of multiple subcarriers over a slot, mini-slot, symbol, etc. The SCI can indicate other resources, including frequency and/or time resources, over which the SL transmitting UE transmits multiple shared channel communications, which can each be for a different SL receiving UE. In addition, for example, transmitting the multiple shared channel communications can include transmitting data over a physical sidelink shared channel (PSSCH). In this regard, for example, a single SCI can indicate frequency and/or time resources over which multiple transport blocks (TBs) of PSSCH transmission are scheduled for transmitting by the SL transmitting UE, where each TB of the multiple TBs may be for a different SL receiving UE. As described, for example, the frequency and/or time resources for the multiple TBs of PSSCH transmission can include a channel of multiple subcarriers over different slots, mini-slots, symbols, or other time divisions.

In some aspects, the SL transmitting UE can transmit SCI in a portion of resources of the PSSCH, such as in a first number of symbols in a first slot of a first PSSCH TB. In other aspects, the SCI can be decoupled from the PSSCH, such that the SL transmitting UE can transmit the SCI separately from the PSSCH. For example, the SL transmitting UE can transmit the SCI in different time resources (e.g., a different time division, such as a different slot, mini-slot, symbol, etc.) and/or in different frequency resources. In another example, where the SCI is decoupled from the PSSCH, the SL transmitting UE can transmit the SCI and PSSCH using different transmit beams, can support cross carrier scheduling where the resource pools for SCI and PSSCH are in different carriers, etc. Moreover, in some aspects, the SCI can be a multiple-stage SCI, including a first stage (or portion) that indicates frequency and/or time resources associated with the PSSCHs, and a second stage (or portion) that indicates other control information associated with the PSSCHs. In one example, the SL transmitting UE can transmit the first stage and second stage as decoupled from the PSSCH. In another example, the SL transmitting UE can transmit the first stage as decoupled from the PSSCH and the second stage in resources along with each PSSCH.

In addition, for example, the first stage SCI can include information that is common to the PSSCHs, and the second stage SCI can include information for each specific PSSCH.

This information may be different depending on whether the second stage SCI is decoupled from the PSSCHs or transmitted with each PSSCH, as described further herein. The aspects described herein can allow for scheduling multiple users with multiple TBs of SL communications over multiple time divisions using a common SCI and/or distributed SCI. This can mitigate overhead associated with otherwise scheduling each single TB using a single SCI. In addition, some SCI for multiple TBs can be combined as information common to the multiple TBs, which can further conserve SCI overhead. Conserving overhead associated with transmitting control information, in this regard, can conserve radio resource used to communicate the control information, improve communication throughput for SL devices, which can improve user experience, etc.

The described features will be presented in more detail below with reference to FIGS. 1-8.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and communicating component 342 for transmitting or receiving SCI scheduling multiple shared channel communications and/or transmitting or receiving the multiple shared channel communications, as described further herein. Though UEs 104-*a* and 104-*b* are shown as having the modem 340 and communicating component 342, this is one illustrative example, and substantially any node or type of node may include a modem 340 and communicating component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an Si interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs (e.g., UE 104-a and 104-b) may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. In addition, in this regard, UEs 104-a, 104-b can use a portion of frequency in the 5 GHz unlicensed frequency spectrum in communicating with the small cell 102', with other cells, with one another using sidelink communications, etc. The UEs 104-a, 104-b, small cell 102', other cells, etc. can use other unlicensed frequency spectrums as well, such as a portion of frequency in the 60 GHz unlicensed frequency spectrum.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172.

The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include machine type communications (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, in a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.), including base station 102 described above and further herein, may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as virtually distributing functionality for at least one unit, which can enable flexibility in network design. The various units of the disaggregated base station, or disaggregated RAN architecture, can be configured for wired or wireless communication with at least one other unit.

In an example, UE 104-*a* can be a SL transmitting UE that can transmit SL communications to multiple SL receiving UEs 104-*b*. In this example, the SL transmitting UE 104-*a* can transmit, to the SL receiving UEs 104-*b*, SCI to schedule resources over which the SL transmitting UE 104-*a* transmits SL communications to the SL receiving UEs 104-*b* (e.g., PSSCH communications). According to aspects described herein, the SL transmitting UE 104-*a* can transmit SCI that schedules multiple TBs of shared channel communications in multiple time divisions (e.g., multiple slots, mini-slots, etc.) to each of multiple SL receiving UEs 104-*b*. In an example, the SL receiving UEs 104-*b* can receive the SCI and process the SCI to determine resources over which to receive the shared channel communications from the SL transmitting UE 104-*a* that are intended for that specific SL receiving UE 104-*b*. The SCI can be a multiple-stage SCI, as described, which can indicate control information common to the multiple TBs in a first stage and/or control information specific to a given TB in a second stage, where the first stage SCI and/or the second stage SCI may be transmitted with the given TB or decoupled from the TB(s). In this example, the SL receiving UE 104-*b* can determine, from the SCI, the parameters for receiving shared channel communications from the SL transmitting UE 104-*a* in one or more of the multiple TBs.

Figure 2:
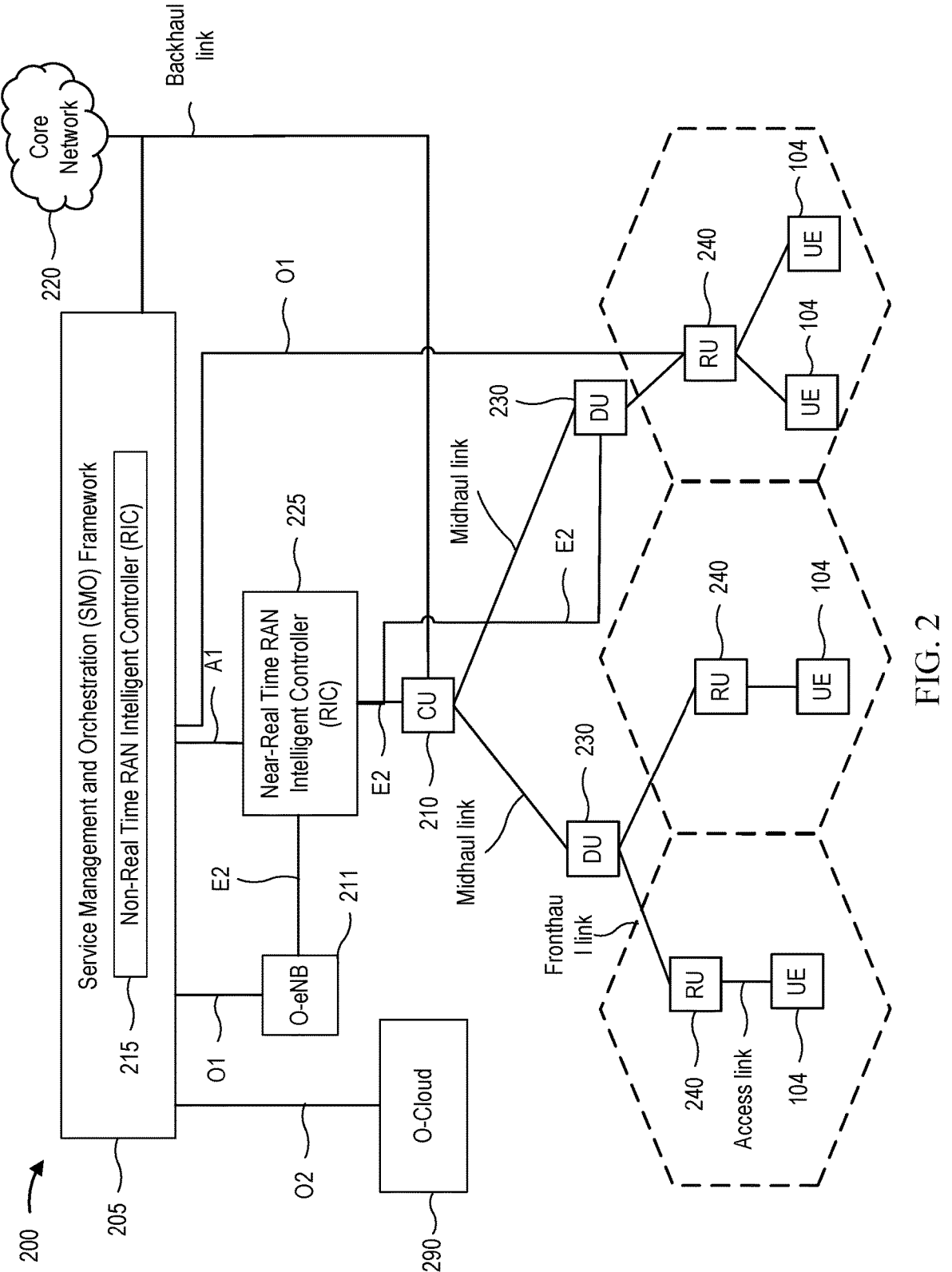
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit—User Plane (CU-UP)), control plane functionality (i.e., Central Unit—Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Turning now to FIGS. 3-8, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
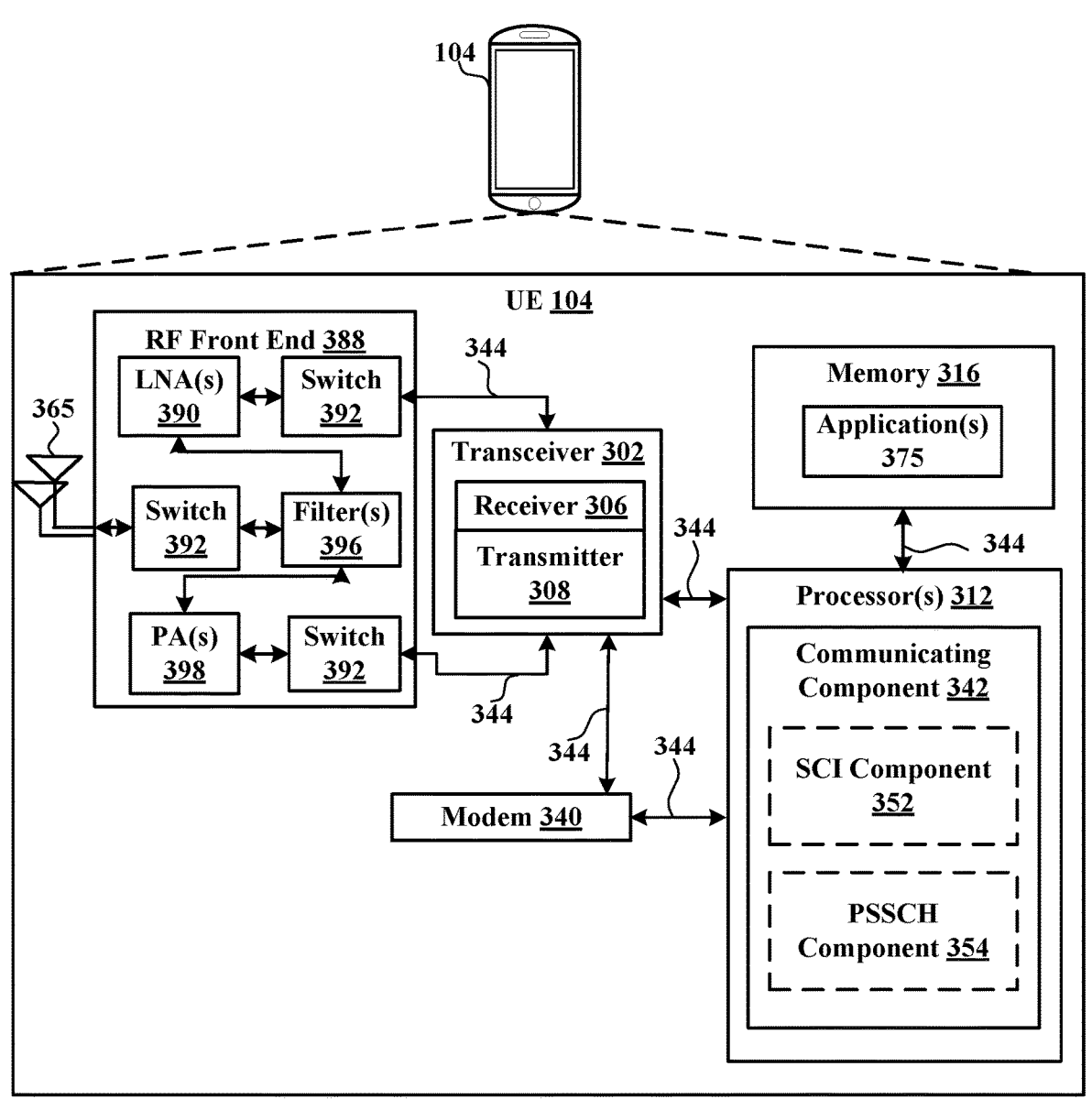
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or communicating component 342 for transmitting or receiving SCI scheduling multiple shared channel communications and/or transmitting or receiving the multiple shared channel communications, as described herein.

In an aspect, the one or more processors 312 can include a modem 340 and/or can be part of the modem 340 that uses one or more modem processors. Thus, the various functions related to communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with communicating component 342 may be performed by transceiver 302.

Also, memory 316 may be configured to store data used herein and/or local versions of applications 375 or communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof.

In an aspect, for example, memory 316 may be a non-transitory computer-readable storage medium that stores one or more computer-executable codes defining communicating component 342 and/or one or more of its subcomponents, and/or data associated therewith, when UE 104 is operating at least one processor 312 to execute communicating component 342 and/or one or more of its subcomponents.

Transceiver 302 may include at least one receiver 306 and at least one transmitter 308. Receiver 306 may include hardware and/or software executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102 or a SL transmitting UE. Additionally, receiver 306 may process such received signals, and also may obtain measurements of the signals, such as, but not limited to, Ec/Io, signal-to-noise ratio (SNR), reference signal received power (RSRP), received signal strength indicator (RSSI), etc. Transmitter 308 may include hardware and/or software executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, receiving wireless communications transmitted by at least one base station 102 or a SL transmitting UE, transmitting wireless communications to at least one base station 102 or a SL receiving UE, etc. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102, one or more other UEs in SL communications, etc. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 342 can optionally include a SCI component 352 for generating and transmitting SCI by a SL transmitting UE, or receiving and processing SCI by a SL receiving UE, and a PSSCH component 354 for generating and transmitting PSSCH, or other scheduled communications, by a SL transmitting UE, or receiving and processing PSSCH, or other scheduled communications, by a SL receiving UE, as described herein.

In an aspect, the processor(s) 312 may correspond to one or more of the processors described in connection with the UE in FIG. 8. Similarly, the memory 316 may correspond to the memory described in connection with the UE in FIG. 8.

FIG. 4 illustrates a flow chart of an example of a method 400 for transmitting a single SCI to schedule multiple TBs of shared channel communications. In an example, a UE (e.g., UE 104-*a*, as a SL transmitting UE in sidelink communications) can perform the functions described in method 400 using one or more of the components described in FIGS. 1 and 3.

In method 400, at Block 402 (e.g., for SL transmitting UE 104-*a*), a first stage SCI that schedules multiple TBs of shared channel communications in multiple time divisions can be transmitted. In an aspect, SCI component 352, e.g., in conjunction with processor(s) 312, memory 316, transceiver 302, communicating component 342, etc., can transmit the first stage SCI (e.g., to a receiving UE, such as SL receiving UE 104-*b*) that schedules multiple TBs of shared channel communications in multiple time divisions. As described, the multiple time divisions may include multiple slots, multiple mini-slots in one or more slots, etc. For example, SCI component 352 can transmit the first stage SCI over control resources, which can include a control resource pool in a frequency range dedicated for control data, or in a portion of resources allocated for PSCCH communications. The first stage SCI can schedule multiple receiving UEs, such that each of the multiple TBs can be scheduled for a different receiving UE (or at least a first TB of the multiple TBs can be scheduled for a first UE and at least a second TB of the multiple TBs can be scheduled for a second UE).

In method 400, optionally at Block 404 (e.g., for SL transmitting UE 104-*a*), a second stage SCI including SCI for multiple receiving UEs can be transmitted. In an aspect, SCI component 352, e.g., in conjunction with processor(s) 312, memory 316, transceiver 302, communicating component 342, etc., can transmit the second stage SCI including the SCI for multiple receiving UEs. In an example, SCI component 352 can transmit the second stage SCI in the control resource pool in the frequency range dedicated for control data (e.g., along with the first stage SCI), or in a portion of resources allocated for PSSCH communications, as described further herein (e.g., where the first stage SCI is transmitted in the control resource pool or otherwise). An example is shown in FIG. 6.

FIG. 6 depicts examples of resource allocations 600, 620 for transmitting a first stage SCI and one or more second stage SCIs for multiple PSSCHs. In resource allocation 600, a control resource pool (RP) 602 can be allocated within a data RP 604 in frequency, though in other examples, the control RP 602 may be outside of the data RP 604 or may partially overlap the data RP 604. In this example, an RP may refer to resources that are generally used for control or data transmissions, which may be resources selected in scheduling the UE in SL Mode 1 or RPs configured for the UE for selecting resources in SL Mode 2. In resource allocation 600, SCI can be transmitted within the control RP 602 as a two-stage SCI including SCI-1 606 and SCI-2 608, which can be transmitted in similar time divisions (e.g., mini-slots) at different frequency subchannels. In this example, the SCI is decoupled from resources used for PSSCH communications which the SCI schedules. For example, SCI-1 602 and SCI-2 604 can be transmitted along with multiple other SCIs in the control RP 602. In one example, each of the multiple SCI-1 606 in the control RP 602 may include or refer to or otherwise be associated with the same SCI-2 that includes parameters common for all of the frequency and/or time resources of PSSCH indicated by the multiple SCI-1s in the control RP 602. For example, SCI-2 608 can be a jumbo SCI in one slot or mini-slot that can include SCI for all the receiving UEs. In an example, SCI-1 606 can schedule multiple TBs for transmitting multiple PSSCHs 610, 612, 614 to different receiving UEs. SCI-1 606 can indicate frequency and/or time resource allocation, or other information, for each of the different receiving UEs to receive one of PSSCH 610, 612, 614, and SCI-2 608 can indicate other control information for the multiple different receiving UEs to receive PSSCHs 610, 612, 614, as described further herein.

In resource allocation 620, SCI can be transmitted within the control RP 622 as a two-stage SCI including SCI-1 626 in the control RP 622, and SCI-2 distributed within the PSSCH resource allocations in the data RP 624, such that PSSCH 630 can include SCI-2 632 indicating control information for PSSCH 630, PSSCH 634 can include SCI-2 636 indicating control information for PSSCH 634, and PSSCH 638 can include SCI-2 640 indicating control information for PSSCH 638. In this example, SCI-1 626 is decoupled from resources used for PSSCH communications which the SCI schedules, but SCI-2 is distributed within the PSSCHs. In one example, each of the multiple SCI-1 626 in the control RP 622 may include or refer to or otherwise be associated with one of the SCI-2 that includes parameters common for a specific PSSCH. In an example, SCI-1 626 can schedule multiple TBs for transmitting multiple PSSCHs 630, 634, 638, and/or the related SCI-2 632, 636, 640, to different receiving UEs. SCI-1 626 can indicate frequency and/or time resource allocation, or other information, for each of the different receiving UEs to receive one of PSSCH 630, 634, 638, and/or the related SCI-2 632, 636, 640, as described further herein.

In one example, to use multi-TTI SCI for multiple receiving UEs, the hybrid automatic repeat/request (HARQ) ID and SAI counter may be indicated in SCI (e.g., as compared to a single receiving UE SCI where only HARQ ID and SAI associated with the first slot are signaled). In addition, for example, to use multi-TTI SCI for multiple receiving UEs, separate TCI state indication can be signaled for each PSSCH slot. In addition, for example, the potential receiving UE for each scheduled slot could be different, and/or the MCS for different receiving UEs can be different—this separate information for each receiving UE may also be indicated in the SCI.

For example, where the second stage SCI is a jumbo SCI-2 that includes combined SCI information for all receiving UEs that are receiving one of multiple TBs (or PSSCHs), such as in resource allocation 600, SCI component 352 can transmit the first stage SCI (e.g., at Block 402) as including TDRA and/or FDRA for a number of PSSCHs in a PSSCH burst (e.g., up to three PSSCH bursts, which may or may not include two PSSCHs for future retransmissions). In one example, indicating, in the first stage SCI, the same TDRA and/or FDRA for all the scheduled receiving UEs in a burst may allow to save on control overhead. In an example, the receiving UEs can determine the TDRA for a specific PSSCH as an offset from the TDRA indicated in the first stage SCI, as shown in resource allocation 600. For multiple receiving UEs, for example, a same number of slots can be reserved for future reserved burst as in initial transmission burst. In addition, for example, SCI component 352 can transmit the first stage SCI as including MCS and beta offset for the common SCI-2 resource allocation (e.g., SCI-2 608). In addition, for example, SCI component 352 can transmit the first stage SCI as including a common DMRS pattern for all slots corresponding to the scheduled TBs. In addition, for example, SCI component 352 can transmit the first stage SCI as including a priority field, which may be based on (or determined by) the highest or lowest priority value among the scheduled TBs. In addition, for example, SCI component 352 can transmit the first stage SCI as including one reserved transmit beam index for each sPSSCH/PSSCH slot in a future reserved burst. For example, to support beam reservation, SCI-1 can also include an identifier of the transmitting UE.

In addition, in this example, where the second stage SCI is a jumbo SCI-2 that includes combined SCI information for all receiving UEs that are receiving one of multiple TBs (or PSSCHs), such as in resource allocation 600, SCI component 352 can transmit the second stage SCI (e.g., at Block 404) as a single SCI-2 including control information for each of the scheduled PSSCH slots. For example, the control information in the single SCI-2 can include destination identifiers (e.g., receiving UE IDs) for each PSSCH slot, and/or HARQ IDs for each PSSCH slot, as each slot could be assigned to different receiving UEs. The control information may also include MCS for each PSSCH, which may include an indication of one MCS for all PSSCHs or MCSs indicated for each PSSCH. For example, as the receiving UEs may have different channel condition, independent MCS for rate control may be indicated, though indicating a single MCS may save control overhead. In addition, as described, the MCS indicated in the SCI-1 can be for SCI-2 rate matching resource indication in PSSCH, and the updated MCSs for each of the scheduled PSSCH (data) can be included in SCI-2. The control information may also include SAI counter values (e.g., if type-2 HARQ codebook is enabled), K1/PRI value (e.g., if multi-bit HARQ codebook is enabled), and/or TCI state of each scheduled PSSCH slot.

In method 400, at Block 406 (e.g., for SL transmitting UE 104-*a*), at least a first TB of the multiple TBs of shared channel communications can be transmitted, to a first receiving UE and based on the first stage SCI, in a first time division of the multiple time divisions. In an aspect, PSSCH component 354, e.g., in conjunction with processor(s) 312, memory 316, transceiver 302, communicating component 342, etc., can transmit, to the first receiving UE (e.g., SL receiving UE 104-*b*) and based on the first stage SCI, at least the first TB of the multiple TBs of shared channel communications in the first time division of the multiple time divisions.

In method 400, at Block 408 (e.g., for SL transmitting UE 104-*a*), at least a second TB of the multiple TBs of shared channel communications can be transmitted, to a second receiving UE and based on the first stage SCI, in a second time division of the multiple time divisions. In an aspect, PSSCH component 354, e.g., in conjunction with processor(s) 312, memory 316, transceiver 302, communicating component 342, etc., can transmit, to the second receiving UE (e.g., SL receiving UE 104-*b*) and based on the first stage SCI, at least the second TB of the multiple TBs of shared channel communications in the second time division of the multiple time divisions.

In the example described above, PSSCH component 354 can transmit at least the first TB and at least the second TB based on the second stage SCI as well (e.g., according to the values specified in the second stage SCI for the first receiving UE and the second receiving UE to process corresponding PSSCHs). For example, PSSCH component 354 can transmit the SCI-2 608 indicating one or more of the above parameters (e.g., receiving UE ID, HARQ ID, MCS, SAI counter value, K1/PRI, TCI state, etc.) for each of PSSCHs 610, 612, 614, and can transmit the corresponding PSSCHs 610, 612, 614 using the parameters. Moreover, for example, PSSCH component 354 can transmit the PSSCHs 610, 612, 614 based on the common parameters in SCI-1 606, such as using the TDRA and/or FDRA indicated in SCI-1 606, common DMRS pattern, priority, etc. In addition, for example, SCI component 352 can transmit the second stage SCI (e.g., SCI-2 608) based on an MCS and/or beta offset indicated in the first stage SCI (e.g., SCI-1 606).

For example, where the second stage SCI is distributed among the PSSCHs, such as in resource allocation 620, in transmitting at least the first TB at Block 406, optionally at Block 410 (e.g., for SL transmitting UE 104-*a*), a first second stage SCI for at least the first TB can be transmitted with at least the first TB. In an aspect, SCI component 352, e.g., in conjunction with processor(s) 312, memory 316, transceiver 302, communicating component 342, etc., can transmit, with at least the first TB, the first second stage SCI for at least the first TB. Similarly, in this example, in transmitting at least the second TB at Block 408, optionally at Block 412 (e.g., for SL transmitting UE 104-*a*), a second second stage SCI for at least the second TB can be transmitted with at least the second TB. In an aspect, SCI component 352, e.g., in conjunction with processor(s) 312, memory 316, transceiver 302, communicating component 342, etc., can transmit, with at least the second TB, the second second stage SCI for at least the second TB. Referring to FIG. 6, for example, SCI component 352 can transmit SCI-2 632 with corresponding PSSCH 630, SCI-2 636 with corresponding PSSCH 634, and/or SCI-2 640 with corresponding PSSCH 638.

In this example, the first stage SCI (e.g., SCI-1 626) may include a common SCI-1 and SCI-2 for different PSSCH slots embedded in the respective slots. For example, SCI component 352 can transmit the first stage SCI (e.g., SCI-1 626) to indicate quasi-colocation (QCL) states of the sPSSCH/PSSCHs, and/or an identifier of the transmitting UE (e.g., instead of repeating it in every SCI-2), In another example, SCI component 352 can transmit the first stage SCI to indicate a common MCS and beta offset for SCI-2 rate matching in each of the PSSCH slots. For example, SCI component 352 can select a conservative MCS and beta offset so that each receiving UE can decode the respective SCI-2.

In one specific example, SCI component 352 may also transmit a common SCI-2 (e.g., in addition to the distributed SCI-2 for each PSSCH), which can indicate other parameters common to the PSSCHs. For example, SCI component 352 can transmit the common SCI-2 to indicate the identifier of the transmitting UE and TCI states, instead of indicating this information in SCI-1. For example, SCI component 352 can transmit the common SCI-2 in the same control RP as SCI-1 (e.g., similarly as SCI-2 608 in resource allocation 600). In another example, SCI component 352 can transmit the common SCI-2 in one of the PSSCH allocations (e.g., in the first PSSCH, such as PSSCH 630, along with SCI-2 632). An example is shown in FIG. 7.

FIG. 7 depicts examples of resource allocations 700, 720 for transmitting a common second stage SCI for multiple PSSCHs. In resource allocation 700, which is similar to resource allocation 620 in FIG. 6, SCI can be transmitted within the control RP 622 as a two-stage SCI including SCI-1 626, a common SCI-2 702 in the control RP 622, and additional SCI-2 distributed within the PSSCH resource allocations, such that PSSCH 630 can include SCI-2 632 indicating control information for PSSCH 630, PSSCH 634 can include SCI-2 636 indicating control information for PSSCH 634, and PSSCH 638 can include SCI-2 640 indicating control information for PSSCH 638. In resource allocation 720, SCI can be transmitted within the PSSCH resources as a two-stage SCI including SCI-1 722 and a common SCI-2 724 in the first PSSCH 726. In addition, each PSSCH includes distributed SCI-2, such that PSSCH 726 can include SCI-2 728 indicating control information for PSSCH 726, PSSCH 730 can include SCI-2 732 indicating control information for PSSCH 730, PSSCH 734 can include SCI-2 736 indicating control information for PSSCH 734, and PSSCH 738 can include SCI-2 740 indicating control information for PSSCH 738.

In addition, in the above examples where at least a portion of the SCI-2 is distributed across PSSCHs, SCI component 352 can transmit each SCI-2 to indicate control information for the respective PSSCH. In one example, SCI component 352 can transmit each respective second stage SCI (e.g., SCI-2 632, 636, 640) to indicate legacy scheduling parameters, the updated MCS, K1/PRI, SAI counter, etc. for the corresponding scheduled PSSCH slot (e.g., PSSCH 630, 634, 638). In an example, this can allow for decoding SCI-2 based on the common assumption of MCS and beta offset indicated in the SCI-1 and update the MCS after decoding the SCI-2 for a given PSSCH slot. In an example, SCI component 352 can transmit SCI-1 or each SCI-2 to indicate the identifier of the transmitting UE.

In method 400, optionally at Block 414 (e.g., for SL transmitting UE 104-*a*), the SCI can be generated. In an aspect, SCI component 352, e.g., in conjunction with processor(s) 312, memory 316, transceiver 302, communicating component 342, etc., can generate the SCI. As described above, SCI component 352 can generate the SCI as a first stage SCI and one or more additional second stage SCIs, indicating the various parameters based on which the PSSCHs are transmitted.

FIG. 5 illustrates a flow chart of an example of a method 500 for receiving a single SCI scheduling multiple TBs of shared channel communications. In an example, a UE (e.g., UE 104-*b*, as a SL receiving UE in sidelink communications) can perform the functions described in method 500 using one or more of the components described in FIGS. 1 and 3.

In method 500, at Block 502 (e.g., for SL receiving UE 104-*b*), a first SCI that schedules multiple TBs of shared channel communications in multiple time divisions can be received. In an aspect, SCI component 352, e.g., in conjunction with processor(s) 312, memory 316, transceiver 302, communicating component 342, etc., can receive (e.g., from a transmitting UE, such as SL transmitting UE 104-*a*) the first stage SCI that schedules multiple TBs of shared channel communications in multiple time divisions. As described, the multiple time divisions may include multiple slots, multiple mini-slots in one or more slots, etc. For example, SCI component 352 can receive the first stage SCI over control resources (e.g., resources allocated for PSCCH communications). In an example, SCI component 352 can attempt to decode the SCI over resources determined as control resources.

In method 500, optionally at Block 504 (e.g., for SL receiving UE 104-*b*), a second stage SCI including SCI for multiple receiving UEs can be received. In an aspect, SCI component 352, e.g., in conjunction with processor(s) 312, memory 316, transceiver 302, communicating component 342, etc., can receive (e.g., from a transmitting UE, such as SL transmitting UE 104-*a*) the second stage SCI including SCI for the multiple receiving UEs. As described, for example, the SCI can schedule multiple TBs (e.g., multiple PSSCHs) for each of multiple different receiving UEs. In an example, the second stage SCI can include control information related to a given one of the multiple TBs or may otherwise be indicated for each of the multiple TBs. As described, for example, the second stage SCI may be received with the first stage SCI (e.g., in a similar control RP, such as SCI-2 608 in resource allocation 600 in FIG. 6). In another example, the second stage SCI may be received with the corresponding PSSCH (e.g., in resources indicated for the corresponding PSSCH, such as SCI-2 632, 636, 640 in resource allocation 620 in FIG. 6). In an example, SCI component 352 can receive the first stage SCI and can use one or more parameters in the first stage SCI to receive the second stage SCI, such as a MCS and beta offset based on which SCI component 352 can perform rate matching for the second stage SCI.

In method 500, optionally at Block 506, the SCI can be processed. In an aspect, SCI component 352, e.g., in conjunction with processor(s) 312, memory 316, transceiver 302, communicating component 342, etc., can process the SC. For example, SCI component 352 can process the first stage SCI, as a common SCI, and/or the second stage SCI that SL receiving UE 104-*b* determines to be intended for it, as described above. For example, SCI component 352 can process the second stage SCI as a combined SCI, and determine which portion(s) of the second stage SCI correspond to PSSCHs that are scheduled for the SL receiving UE 104-*b*. This may be based on a receiving UE identifier indicated in the second stage SCI, which can also me associated with additional control information for decoding/processing the PSSCH, as described above and further herein.

In another example, SCI component 352 can process the second stage SCI as one of multiple distributed second stage SCIs, and determine which of the distributed second stage SCI(s) correspond to PSSCHs that are scheduled for the SL receiving UE 104-*b* (e.g., based on parameters within the second stage SCI(s)).

In method 500, at Block 508 (e.g., for SL receiving UE 104-*b*), at least a first TB of the multiple TBs of shared channel communications can be received, based on the first stage SCI, in a first time division of the multiple time divisions. In an aspect, PSSCH component 354, e.g., in conjunction with processor(s) 312, memory 316, transceiver 302, communicating component 342, etc., can receive (e.g., from a transmitting UE, such as SL transmitting UE 104-*a*), based on the first stage SCI (and/or the second stage SCI), at least the first TB of the multiple TBs of shared channel communications in the first time division of the multiple time divisions.

In the example described above, PSSCH component 354 can receive at least the first TB based on the second stage SCI as well (e.g., according to the values specified in the second stage SCI for the first receiving UE and the second receiving UE to process corresponding PSSCHs). For example, PSSCH component 354 can receive the SCI-2 608 indicating one or more of the above parameters (e.g., receiving UE ID, HARQ ID, MCS, SAI counter value, K1/PRI, TCI state, etc.) for each of PSSCHs 610, 612, 614, and can receive one (or more) of the corresponding PSSCHs 610, 612, 614 using the parameters. For example, PSSCH component 354 can determine which of the PSSCHs 610, 612, 614 are intended for it based on the receiving UE identifiers in SCI-2 608, and can receive the PSSCH, as described further herein, based on MCS, priority field, common DMRS, TCI state, etc. In addition, communicating component 342 can transmit feedback for the PSSCH based on corresponding HARQ ID, SAI counter value, K1/PRI, etc. In yet another example, PSSCH component 354 can determine, from the first stage SCI, a reserved transmit beam index for each sPSSCH/PSSCH slot in a future reserved burst for receiving the future reserved burst (e.g., a retransmission burst).

In another example described above, where the second stage SCI is distributed among the PSSCHs, such as in resource allocation 620, in receiving at least the first TB at Block 508, optionally at Block 510 (e.g., for SL receiving UE 104-b), a first second stage SCI for at least the first TB can be received with at least the first TB. In an aspect, SCI component 352, e.g., in conjunction with processor(s) 312, memory 316, transceiver 302, communicating component 342, etc., can receive, with at least the first TB, the first second stage SCI for at least the first TB. Referring to FIG. 6, for example, SCI component 352 can receive SCI-2 632 with corresponding PSSCH 630, SCI-2 636 with corresponding PSSCH 634, or SCI-2 640 with corresponding PSSCH 638. In one example, SCI component 352 can determine which PSSCH is intended for it (based on parameters in SCI-1 or a common SCI-2, or based on decoding each SCI-2), and can accordingly receive the PSSCH. In one example, SCI component 352 can determine the QCL state of the sPSSCH/PSSCHs, and PSSCH component 354 can receive each sPSSCH/PSSCH based on the QCL state. In addition, in an example, SCI component 352 can receive the second stage SCI in each sPSSCH/PSSCH slot based on parameters indicated in the first stage SCI, such as MCS and beta offset used to rate match in the slot.

In method 500, optionally at Block 512, the PSSCH can be processed based on the SCI. In an aspect, PSSCH component 354, e.g., in conjunction with processor(s) 312, memory 316, transceiver 302, communicating component 342, etc., can process the PSSCH based on the SCI. For example, PSSCH component 354 can decode or process the appropriate PSSCH based on parameters in SCI-1 606 (or 626) which may be common for all PSSCHs, and/or parameters in SCI-2 608 (or 632, 636, or 640) that are identified as related to the PSSCH intended for the SL receiving UE 104-b.

For example, PSSCH component 354 can process one (or more) of the PSSCHs 610, 612, 614 based on the common parameters in SCI-1 606, such as using the TDRA and/or FDRA indicated in SCI-1 606, common DMRS pattern, priority, etc. In one example, SCI component 352 can process SCI-2, which can include processing SCI-2 608 or SCI-2 632, 636, 640 corresponding to the PSSCH intended for the SL receiving UE 104-b, based on parameters in SCI-1 (e.g., receiving UE identifier, MCS and beta offset, etc.). In one example, SCI component 352 can determine which PSSCH is intended for the SL receiving UE 104-b based on the receiving UE identifier in SCI-2 608 or 632, 636, or 640, and can accordingly process the corresponding PSSCH 610, 612, 614, 630, 634, or 638.

In one example, SCI component 352 can receive each respective second stage SCI (e.g., SCI-2 632, 636, 640) as indicating legacy scheduling parameters, the updated MCS, K1/PRI, SAI counter, etc. for the corresponding scheduled PSSCH slot (e.g., PSSCH 630, 634, 638). In an example, SCI component 352 can decode SCI-2 based on the common assumption of MCS and beta offset indicated in the SCI-1 and update the MCS after decoding the SCI-2 for a given PSSCH slot. PSSCH component 354 can accordingly process the PSSCH, as described above, which can include receiving data transmitted in the PSSCH, transmitting feedback over appropriate feedback resources and/or using appropriate feedback identifiers (e.g., based on HARQ ID, SAI counter value, K1/PRI, etc. indicated in SCI-2), receiving a reserved transmission burst based on an indicated reserved beam, etc.

Figure 8:
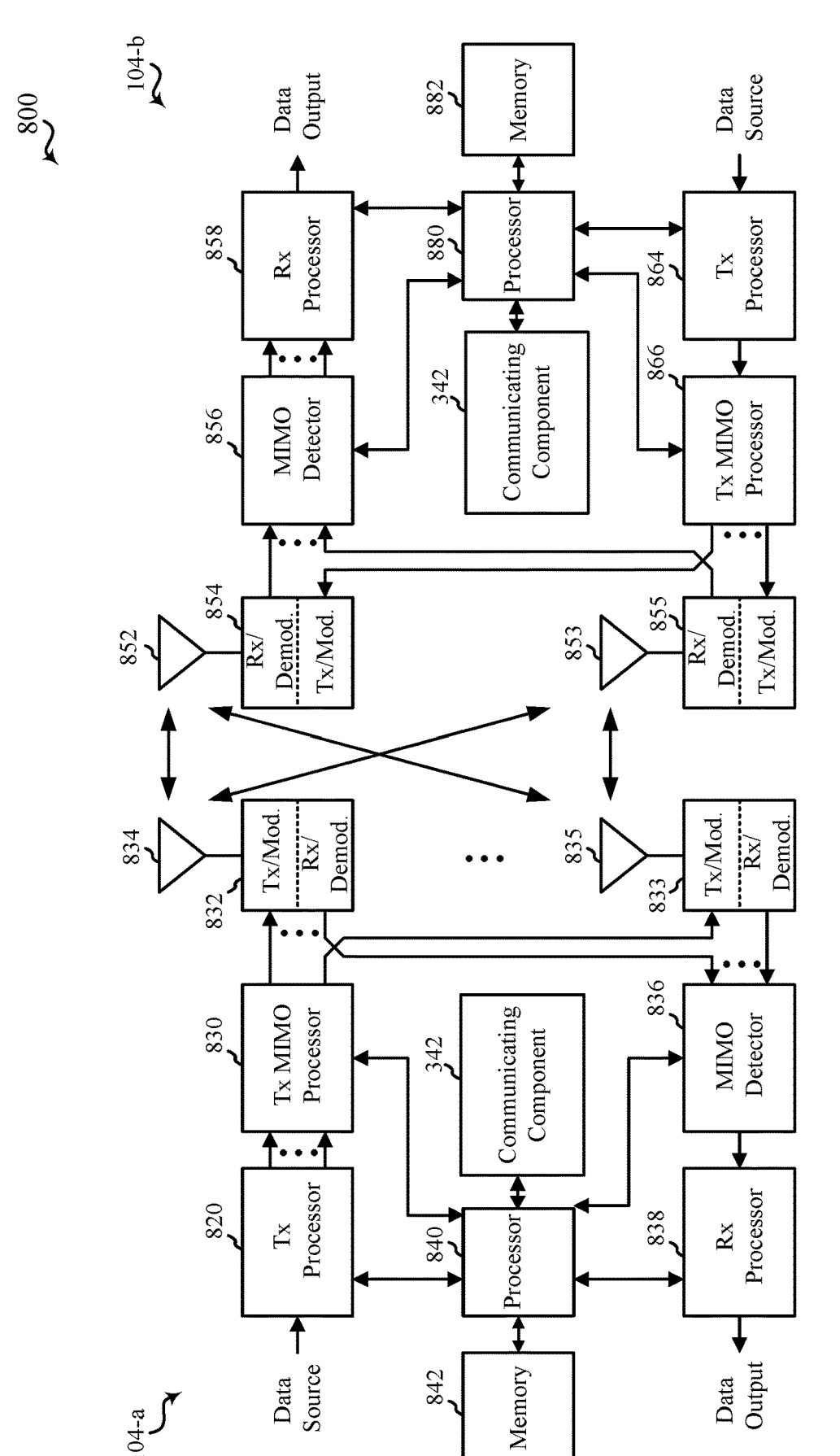
FIG. 8 is a block diagram illustrating an example of a MIMO communication system including a base station and a UE, in accordance with various aspects of the present disclosure.

FIG. 8 is a block diagram of a MIMO communication system 800 including UEs 104-a, 104-b. The MIMO communication system 800 may illustrate aspects of the wireless communication access network 100 described with reference to FIG. 1. The UE 104-a may be an example of aspects of the UE 104 described with reference to FIGS. 1 and 3. The UE 104-a may be equipped with antennas 834 and 835, and the UE 104-b may be equipped with antennas 852 and 853. In the MIMO communication system 800, the UEs 104-a, 104-b may be able to send data over multiple communication links at the same time. Each communication link may be called a "layer" and the "rank" of the communication link may indicate the number of layers used for communication. For example, in a 2×2 MIMO communication system where UE 104-a transmits two "layers," the rank of the communication link between the UE 104-a and the UE 104-b is two.

At the UE 104-a, a transmit (Tx) processor 820 may receive data from a data source. The transmit processor 820 may process the data. The transmit processor 820 may also generate control symbols or reference symbols. A transmit MIMO processor 830 may perform spatial processing (e.g., precoding) on data symbols, control symbols, or reference symbols, if applicable, and may provide output symbol streams to the transmit modulator/demodulators 832 and 833. Each modulator/demodulator 832 through 833 may process a respective output symbol stream (e.g., for OFDM, etc.) to obtain an output sample stream. Each modulator/demodulator 832 through 833 may further process (e.g., convert to analog, amplify, filter, and upconvert) the output sample stream to obtain a DL signal. In one example, DL signals from modulator/demodulators 832 and 833 may be transmitted via the antennas 834 and 835, respectively.

The UE 104-b may be an example of aspects of the UEs 104 described with reference to FIGS. 1 and 3. At the UE 104-b, the UE antennas 852 and 853 may receive the signals from the UE 104-a (e.g., over a sidelink) and may provide the received signals to the modulator/demodulators 854 and 855, respectively. Each modulator/demodulator 854 through 855 may condition (e.g., filter, amplify, downconvert, and digitize) a respective received signal to obtain input samples. Each modulator/demodulator 854 through 855 may further process the input samples (e.g., for OFDM, etc.) to obtain received symbols. A MIMO detector 856 may obtain received symbols from the modulator/demodulators 854 and 855, perform MIMO detection on the received symbols, if applicable, and provide detected symbols. A receive (Rx) processor 858 may process (e.g., demodulate, deinterleave, and decode) the detected symbols, providing decoded data for the UE 104-b to a data output, and provide decoded control information to a processor 880, or memory 882.

At the UE 104-*b*, a transmit processor 864 may receive and process data from a data source. The transmit processor 864 may also generate reference symbols for a reference signal. The symbols from the transmit processor 864 may be precoded by a transmit MIMO processor 866 if applicable, further processed by the modulator/demodulators 854 and 855 (e.g., for SC-FDMA, etc.), and be transmitted to the UE 104-*a* in accordance with the communication parameters received from the UE 104-*a*. At the UE 104-*a*, the signals from the UE 104-*b* may be received by the antennas 834 and 835, processed by the modulator/demodulators 832 and 833, detected by a MIMO detector 836 if applicable, and further processed by a receive processor 838. The receive processor 838 may provide decoded data to a data output and to the processor 840 or memory 842.

The processor 840 and/or 880 may in some cases execute stored instructions to instantiate a communicating component 342 (see e.g., FIGS. 1 and 3).

The components of the UEs 104-*a*, 104-*b* may, individually or collectively, be implemented with one or more ASICs adapted to perform some or all of the applicable functions in hardware. Each of the noted modules may be a means for performing one or more functions related to operation of the MIMO communication system 800. Similarly, the components of the UE 104-*a* may, individually or collectively, be implemented with one or more ASICs adapted to perform some or all of the applicable functions in hardware. Each of the noted components may be a means for performing one or more functions related to operation of the MIMO communication system 800.

The following aspects are illustrative only and aspects thereof may be combined with aspects of other embodiments or teaching described herein, without limitation.

Aspect 1 is a method for wireless communication by a transmitting UE in sidelink communications including transmitting a first stage SCI that schedules multiple TBs of shared channel communications in multiple time divisions, where each of the multiple TBs is for a different receiving UE of multiple receiving UEs, transmitting, to a first receiving UE of the multiple receiving UEs and based on the first stage SCI, at least a first TB of the multiple TBs of shared channel communications in a first time division of the multiple time divisions, and transmitting, to a second receiving UE of the multiple receiving UEs and based on the first stage SCI, at least a second TB of the multiple TBs of shared channel communications in a second time division of the multiple time divisions.

In Aspect 2, the method of Aspect 1 includes transmitting, with the first stage SCI, a second stage SCI including SCI for the multiple receiving UEs.

In Aspect 3, the method of Aspect 2 includes where the first stage SCI further indicates at least one of a time domain resource allocation for the multiple TBs, a frequency domain resource allocation for the multiple TBs, a common DMRS pattern for the multiple TBs, or a priority field for the multiple TBs.

In Aspect 4, the method of any of Aspects 2 or 3 include where the first stage SCI further indicates a MCS and beta offset for the second stage SCI.

In Aspect 5, the method of any of Aspects 2 to 4 includes where the first stage SCI indicates a reserved transmit beam for each of multiple reserved TBs in a future reserved burst.

In Aspect 6, the method of any of Aspects 2 to 5 includes where the second stage SCI indicates a destination identifier for each of the multiple receiving UEs.

In Aspect 7, the method of any of Aspects 2 to 6 includes where the second stage SCI indicates a HARQ process identifier for each of the multiple TBs.

In Aspect 8, the method of any of Aspects 2 to 7 includes where the second stage SCI separately indicates a MCS for each of the multiple TBs.

In Aspect 9, the method of any of Aspects 2 to 8 includes where the second stage SCI indicates a SAI for each of the multiple TBs.

In Aspect 10, the method of any of Aspects 2 to 9 includes where the second stage SCI indicates K1 offset or a PRI value for each of the multiple TBs.

In Aspect 11, the method of any of Aspects 2 to 10 includes where the second stage SCI indicates TCI states for each of the multiple TBs.

In Aspect 12, the method of any of Aspects 1 to 11 includes where transmitting at least the first TB includes transmitting a first second stage SCI with at least the first TB, and where transmitting at least the second TB includes transmitting a second second stage SCI with at least the second TB.

In Aspect 13, the method of Aspect 12 includes where transmitting at least the first TB includes transmitting the first stage SCI in at least the first TB.

In Aspect 14, the method of Aspect 13 includes where the first second stage SCI indicates at least one of an identifier of the transmitting UE or TCI states for each of the multiple TBs.

In Aspect 15, the method of any of Aspects 12 to 14 includes where transmitting the first stage SCI is in a slot preceding at least the first TB and at least the second TB.

In Aspect 16, the method of Aspect 15 includes transmitting, with the first stage SCI, a common second stage SCI, where the common second stage SCI indicates at least one of an identifier of the transmitting UE or TCI states for each of the multiple TBs.

In Aspect 17, the method of any of Aspects 12 to 16 includes where the first stage SCI indicates QCL states for each of the multiple TBs.

In Aspect 18, the method of any of Aspects 12 to 17 includes where the first stage SCI indicates an identifier of the transmitting UE.

In Aspect 19, the method of any of Aspects 12 to 18 includes where the first stage SCI indicates a common MCS and beta offset for rate matching the second stage SCI in each of the multiple TBs.

In Aspect 20, the method of any of Aspects 12 to 19 includes where the first second stage SCI indicates at least one of first scheduling parameters, a first updated MCS, or a first K1 offset or first PRI value, for at least the first TB, and where the second second stage SCI indicates at least one of second scheduling parameters, a second updated MCS, or a second K1 offset or second PRI value, for at least the second TB.

Aspect 21 is a method for wireless communication by a receiving UE in sidelink communications including receiving a first stage SCI that schedules multiple TBs of shared channel communications in multiple time divisions, where each of the multiple TBs is for a different receiving UE of multiple receiving UEs, and receiving, based on the first stage SCI, at least a first TB of the multiple TBs of shared channel communications in a first time division of the multiple time divisions.

In Aspect 22, the method of Aspect 21 includes receiving, with the first stage SCI, a second stage SCI including SCI for the multiple receiving UEs.

In Aspect 23, the method of Aspect 22 includes where the first stage SCI further indicates at least one of a TDRA for the multiple TBs, a FDRA for the multiple TBs, a common DMRS pattern for the multiple TBs, or a priority field for the multiple TBs, and where receiving at least the first TB is based at least in part on at least one of the TDRA, the FDRA, the common DMRS pattern, or the priority field.

In Aspect 24, the method of any of Aspects 22 or 23 includes where the first stage SCI further indicates a MCS and beta offset for the second stage SCI, and rate matching the second stage SCI based at least in part on the MCS and beta offset.

In Aspect 25, the method of any of Aspects 22 to 24 includes where the first stage SCI indicates a reserved transmit beam for each of multiple reserved TBs in a future reserved burst.

In Aspect 26, the method of any of Aspects 22 to 25 includes where the second stage SCI indicates a destination identifier for each of the multiple receiving UEs, and where receiving at least the first TB is based at least in part on the destination identifier associated with at least the first TB in the second stage SCI.

In Aspect 27, the method of any of Aspects 22 to 26 includes where the second stage SCI indicates a HARQ process identifier for each of the multiple TBs, and transmitting, to the transmitting UE, feedback for the at least the first. TB based on the HARQ process identifier.

In Aspect 28, the method of any of Aspects 22 to 27 includes where the second stage SCI separately indicates a MCS for each of the multiple TBs, and where receiving at least the first TB is based at least in part on the MCS indicated for the at least the first TB.

In Aspect 29, the method of any of Aspects 22 to 28 includes where the second stage SCI indicates a SAI for each of the multiple TBs, and transmitting, to the transmitting UE, feedback for the at least the first TB based on the SAI.

In Aspect 30, the method of any of Aspects 22 to 29 includes where the second stage SCI indicates K1 offset or a PRI value for each of the multiple TBs, and where receiving at least the first TB is based at least in part on the K1 offset or PRI indicated for the at least the first TB.

In Aspect 31, the method of any of Aspects 22 to 30 includes where the second stage SCI indicates TCI states for each of the multiple TBs, and where receiving at least the first TB is based at least in part on the TCI state indicated for the at least the first TB.

In Aspect 32, the method of any of Aspects 21 to 31 includes where receiving at least the first TB includes receiving a second stage SCI with at least the first TB.

In Aspect 33, the method of Aspect 32 includes where receiving at least the first TB includes receiving the first stage SCI in at least the first TB.

In Aspect 34, the method of Aspect 33 includes where the first second stage SCI indicates at least one of an identifier of the transmitting UE or TCI states for each of the multiple TBs, and where receiving at least the first TB is based at least in part on the TCI state indicated for the at least the first TB.

In Aspect 35, the method of any of Aspects 32 to 34 includes where receiving the first stage SCI is in a slot preceding at least the first TB.

In Aspect 36, the method of Aspect 35 includes receiving, with the first stage SCI, a common second stage SCI, where the common second stage SCI indicates at least one of an identifier of the transmitting UE or TCI states for each of the multiple TBs, and where receiving at least the first TB is based at least in part on the TCI state indicated for the at least the first TB.

In Aspect 37, the method of any of Aspects 32 to 36 includes where the first stage SCI indicates QCL states for each of the multiple TBs, and where receiving at least the first TB is based at least in part on the QCL state indicated for the at least the first TB.

In Aspect 38, the method of any of Aspects 32 to 37 includes where the first stage SCI indicates an identifier of the transmitting UE.

In Aspect 39, the method of any of Aspects 32 to 38 includes where the first stage SCI indicates a common MCS and beta offset for rate matching the second stage SCI in each of the multiple TBs, and further comprising rate matching the second stage SCI based on the common MCS and beta offset.

In Aspect 40, the method of any of Aspects 32 to 39 includes where the second stage SCI indicates at least one of scheduling parameters, a updated MCS, or a K1 offset or first PRI value, for at least the first TB, and where receiving at least the first TB is based at least in part on the scheduling parameters, the updated MCS, the K1 offset or PRI indicated for the at least the first TB.

Aspect 41 is an apparatus for wireless communication including a transceiver, a memory configured to store instructions, and one or more processors communicatively coupled with the memory and the transceiver, where the one or more processors are configured to execute the instructions to cause the apparatus to perform one or more of the methods of any of Aspects 1 to 40.

Aspect 42 is an apparatus for wireless communication including means for performing one or more of the methods of any of Aspects 1 to 40.

Aspect 43 is a computer-readable medium including code executable by one or more processors for wireless communications, the code including code for performing one or more of the methods of any of Aspects 1 to 40.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques.

These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these.

Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or" as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a transceiver;
a memory configured to store instructions; and
one or more processors communicatively coupled with the memory and the transceiver, wherein the one or more processors are configured to:
 transmit a first stage sidelink control information (SCI) that schedules multiple transport blocks (TBs) of shared channel communications in multiple time divisions, wherein each of the multiple TBs is for a different receiving UE of multiple receiving UEs;
 transmit one or more second stage SCIs including separate SCI for each of the multiple receiving UEs;
 transmit, to a first receiving UE of the multiple receiving UEs and based on the first stage SCI and the one or more second stage SCIs, at least a first TB of the multiple TBs of shared channel communications in a first time division of the multiple time divisions; and
 transmit, to a second receiving UE of the multiple receiving UEs and based on the first stage SCI and the one or more second stage SCIs, at least a second TB of the multiple TBs of shared channel communications in a second time division of the multiple time divisions,
wherein the one or more processors are configured to transmit at least the first TB at least in part by transmitting a first second stage SCI of the one or more second stage SCIs with at least the first TB,
wherein the one or more processors are configured to transmit at least the second TB at least in part by transmitting a second second stage SCI of the one or more second stage SCIs with at least the second TB, and
wherein the one or more processors are configured to transmit the first stage SCI in a slot preceding at least the first TB and at least the second TB.

2. The apparatus of claim 1, wherein the one or more processors are further configured to transmit, with the first stage SCI, multiple second stage SCIs for the multiple receiving UEs.

3. The apparatus of claim 2, wherein the first stage SCI further indicates at least one of a time domain resource allocation for the multiple TBs, a frequency domain resource allocation for the multiple TBs, a common demodulation reference signal (DMRS) pattern for the multiple TBs, or a priority field for the multiple TBs.

4. The apparatus of claim 2, wherein the first stage SCI further indicates at least one of a modulation and coding scheme (MCS) and beta offset for the second stage SCI, or a reserved transmit beam for each of multiple reserved TBs in a future reserved burst.

5. The apparatus of claim 2, wherein the multiple second stage SCIs indicate at least one of a destination identifier for each of the multiple receiving UEs, a hybrid automatic repeat/request (HARQ) process identifier for each of the multiple TBs, a separate indication of a modulation and coding scheme (MCS) for each of the multiple TBs, a sidelink acknowledgement index (SAI) for each of the multiple TBs, a K1 offset or a physical uplink control channel (PUCCH) resource indicator (PRI) value for each of the multiple TBs, or a transmission configuration indicator (TCI) states for each of the multiple TBs.

6. The apparatus of claim 1, wherein the one or more processors are configured to transmit at least the first TB at least in part by transmitting the first stage SCI in at least the first TB.

7. The apparatus of claim 6, wherein the first second stage SCI indicates at least one of an identifier of the apparatus or transmission configuration indicator (TCI) states for each of the multiple TBs.

8. The apparatus of claim 1, wherein the one or more processors are configured to transmit, with the first stage SCI, a common second stage SCI, wherein the common second stage SCI indicates at least one of an identifier of the apparatus or transmission configuration indicator (TCI) states for each of the multiple TBs.

9. The apparatus of claim 1, wherein the first stage SCI indicates at least one of a quasi-colocation (QCL) states for each of the multiple TBs, an identifier of a transmitting UE, or a common modulation and coding scheme (MCS) and beta offset for rate matching the second stage SCI in each of the multiple TBs.

10. The apparatus of claim 1, wherein the first second stage SCI indicates at least one of first scheduling parameters, a first updated modulation and coding scheme (MCS), or a first K1 offset or first physical uplink control channel (PUCCH) resource indicator (PRI) value, for at least the first TB, and wherein the second second stage SCI indicates at least one of second scheduling parameters, a second updated MCS, or a second K1 offset or second PRI value, for at least the second TB.

11. An apparatus for wireless communication, comprising:

a transceiver;

a memory configured to store instructions; and one or more processors communicatively coupled with the memory and the transceiver, wherein the one or more processors are configured to:

receive a first stage sidelink control information (SCI) that schedules multiple transport blocks (TBs) of shared channel communications in multiple time divisions, wherein each of the multiple TBs is for a different receiving UE of multiple receiving UEs;

receive one or more second stage SCIs including separate SCI for each of the multiple receiving UEs; and receive, based on the first stage SCI and a second stage SCI of the one or more second stage SCIs that is for the apparatus, at least a first TB of the multiple TBs of shared channel communications in a first time division of the multiple time divisions, wherein the one or more processors are further configured to receive, with the first stage SCI, multiple second stage SCIs for the multiple receiving UEs, wherein the first stage SCI further indicates at least one of a time domain resource allocation (TDRA) for the multiple TBs, a frequency domain resource allocation (FDRA) for the multiple TBs, a common demodulation reference signal (DMRS) pattern for the multiple TBs, or a priority field for the multiple TBs, and wherein the one or more processors are configured to receive at least the first TB based at least in part on at least one of the TDRA, the FDRA, the common DMRS pattern, or the priority field.

12. The apparatus of claim 11, wherein the first stage SCI further indicates a modulation and coding scheme (MCS) and beta offset for the second stage SCI, and wherein the one or more processors are further configured to rate match the second stage SCI based at least in part on the MCS and beta offset.

13. The apparatus of claim 11, wherein the first stage SCI indicates a reserved transmit beam for each of multiple reserved TBs in a future reserved burst.

14. The apparatus of claim 11, wherein the multiple second stage SCIs indicate at least one of a destination identifier for each of the multiple receiving UEs, and wherein the one or more processors are configured to receive at least the first TB based at least in part on the destination identifier associated with at least the first TB in the second stage SCI.

15. The apparatus of claim 11, wherein the multiple second stage SCIs indicate a hybrid automatic repeat/request (HARQ) process identifier for each of the multiple TBs, and wherein the one or more processors are further configured to transmit, to a transmitting UE, feedback for the at least the first TB based on the HARQ process identifier.

16. The apparatus of claim 11, wherein the multiple second stage SCIs separately indicate a modulation and coding scheme (MCS) for each of the multiple TBs, and wherein the one or more processors are configured to receive at least the first TB based at least in part on the MCS indicated for the at least the first TB.

17. The apparatus of claim 11, wherein the multiple second stage SCIs indicate a sidelink acknowledgement index (SAI) for each of the multiple TBs, and wherein the one or more processors are further configured to transmit, to a transmitting UE, feedback for the at least the first TB based on the SAI.

18. The apparatus of claim 11, wherein the multiple second stage SCIs indicate K1 offset or a physical uplink control channel (PUCCH) resource indicator (PRI) value for each of the multiple TBs, and wherein the one or more processors are configured to receive at least the first TB based at least in part on the K1 offset or PRI indicated for the at least the first TB.

19. The apparatus of claim 11, wherein the multiple second stage SCIs indicate transmission configuration indicator (TCI) states for each of the multiple TBs, and wherein the one or more processors are configured to receive at least the first TB based at least in part on the TCI state indicated for the at least the first TB.

20. The apparatus of claim 11, wherein the one or more processors are configured to receive at least the first TB at least in part by receiving the second stage SCI with at least the first TB.

21. The apparatus of claim 20, wherein the one or more processors are configured to receive at least the first TB at least in part by receiving the first stage SCI in at least the first TB.

22. The apparatus of claim 21, wherein the first stage SCI indicates at least one of an identifier of a transmitting UE or transmission configuration indicator (TCI) states for each of the multiple TBs, and wherein the one or more processors are configured to receive at least the first TB based at least in part on the TCI state indicated for the at least the first TB.

23. A method for wireless communication by a transmitting user equipment (UE) in sidelink communications, comprising:

transmitting a first stage sidelink control information (SCI) that schedules multiple transport blocks (TBs) of shared channel communications in multiple time divisions, wherein each of the multiple TBs is for a different receiving UE of multiple receiving UEs;

transmitting one or more second stage SCIs including separate SCI for each of the multiple receiving UEs;

transmitting, to a first receiving UE of the multiple receiving UEs and based on the first stage SCI and the one or more second stage SCIs, at least a first TB of the multiple TBs of shared channel communications in a first time division of the multiple time divisions; and transmitting, to a second receiving UE of the multiple receiving UEs and based on the first stage SCI and the one or more second stage SCIs, at least a second TB of the multiple TBs of shared channel communications in a second time division of the multiple time divisions, wherein transmitting at least the first TB includes transmitting a first second stage SCI of the one or more second stage SCIs with at least the first TB, wherein transmitting at least the second TB includes transmitting a second second stage SCI of the one or more second stage SCIs with at least the second TB, and wherein transmitting the first stage SCI includes transmitting the first stage SCI in a slot preceding at least the first TB and at least the second TB.

24. The method of claim 23, further comprising transmitting, with the first stage SCI, multiple second stage SCIs for the multiple receiving UEs.

25. A method for wireless communication by a receiving user equipment (UE) in sidelink communications, comprising:

receiving a first stage sidelink control information (SCI) that schedules multiple transport blocks (TBs) of shared channel communications in multiple time divisions, wherein each of the multiple TBs is for a different receiving UE of multiple receiving UEs;

receiving one or more second stage SCIs including separate SCI for each of the multiple receiving UEs;

receiving, based on the first stage SCI and a second stage SCI of the one or more second stage SCIs that is for the UE, at least a first TB of the multiple TBs of shared channel communications in a first time division of the multiple time divisions; and receiving, with the first stage SCI, multiple second stage SCIs for the multiple receiving UEs, wherein the first stage SCI further indicates at least one of a time domain resource allocation (TDRA) for the multiple TBs, a frequency domain resource allocation (FDRA) for the multiple TBs, a common demodulation reference signal (DMRS) pattern for the multiple TBs, or a priority field for the multiple TBs, and wherein receiving at least the first TB is based at least in part on at least one of the TDRA, the FDRA, the common DMRS pattern, or the priority field.

26. The method of claim 25, further comprising receiving, with the first stage SCI, multiple second stage SCIs for the multiple receiving UEs.

\* \* \* \* \*